United States Patent
Mulligan et al.

(10) Patent No.: US 6,218,607 B1
(45) Date of Patent: Apr. 17, 2001

(54) COMPACT MAN-PORTABLE THERMOPHOTOVOLTAIC BATTERY CHARGER

(75) Inventors: William P. Mulligan; John E. Samaras, both of Seattle; Lewis M. Fraas, Issaquah, all of WA (US)

(73) Assignee: JX Crystals Inc., Issaquah, WA (US)

( * ) Notice: Subject to any disclaimer, the term of this patent is extended or adjusted under 35 U.S.C. 154(b) by 0 days.

(21) Appl. No.: 09/079,395

(22) Filed: May 15, 1998

Related U.S. Application Data (60) Provisional application No. 60/046,588, filed on May 15, 1997.

(51) Int. Cl.[7] ................................................. H01L 31/00
(52) U.S. Cl. ............................................................... 136/253
(58) Field of Search ................................................. 136/253

(56) References Cited

U.S. PATENT DOCUMENTS

| | | | |
|---|---|---|---|
| 3,433,676 | 3/1969 | Stein | 136/253 |
| 3,751,303 | 8/1973 | Kittl | 136/253 |
| 4,234,352 | 11/1980 | Swanson | 136/253 |
| 4,707,560 | 11/1987 | Hottel et al. | 136/253 |
| 4,776,895 | 10/1988 | Goldstein | 136/253 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,401,329 | 3/1995 | Fraas et al. | 136/253 |
| 5,403,405 | 4/1995 | Fraas et al. | 136/253 |
| 5,439,532 | 8/1995 | Fraas | 136/253 |
| 5,512,109 | 4/1996 | Fraas et al. | 136/253 |
| 5,551,992 | 9/1996 | Fraas | 136/253 |
| 5,560,783 | 10/1996 | Hamlen | 136/253 |
| 5,616,186 | 4/1997 | Fraas et al. | 136/253 |
| 5,865,906 | 2/1999 | Ferguson et al. | 136/253 |

OTHER PUBLICATIONS

E. Kittle, Design Analysis of IPV–Generator System, Proc. 25th Annual Power Sources Conf. May 1972, pp. 106–110.

D.G. Pelka, Natural Gas–Fired Thermophotovoltaic System, Proc. 32nd International Power Sources Conf. Jun. 1986, pp. 110–123.

(List continued on next page.)

*Primary Examiner*—Mark Chapman
(74) *Attorney, Agent, or Firm*—James Creighton Wray; Meera P. Narasimhan (57) ABSTRACT

A small and light cylindrical thermophotovoltaic generator uses gaseous fuels, a counter flow heat exchanger, regenerator and low bandgap photovoltaic cells. In the fuel injection system, with preheated air from a recuperator, fuel combustion begins immediately when the fuel and air first meet. A hot and compact burn results from complete and rapid fuel and air mixing. A venturi necks down the air flow, and a chemically etched jet shim disk creates over 150 small fuel jet streams. The emitter geometric configuration provides good hot gas energy transfer to the IR emitter. Four alternate emitter configurations accomplish the good heat transfer. One emitter is a composite SiC with integrally formed internal fins which extend into the combustion chamber. The photovoltaic converter assembly has good spectral control, good high rate but lightweight heat removal and high current-carrying capability, while maintaining low parasitic IR absorption. A modular photovoltaic converter circuit is complete with series connected low bandgap filtered cells, a heat spreader and high current-carrying mirror-shielded interconnects. An efficient but lightweight and short heat exchanger regenerator is fairly easy to fabricate by inserting an array of angled vanes through slits in a simple cylinder. One regenerator is formed with integrally extruded or machined fins on a high temperature SiC composite.

43 Claims, 4 Drawing Sheets

OTHER PUBLICATIONS

M.D. Morgan, Radioisotope Thermal Photovoltaic Application of the GaSb,Solar Cell,10.,Space Photovoltaic Research and Technology Conference, Nov. 1989, pp. 349–358.

H. Hofler, Selective Emitters for Thermophotovoltaic Solar Energy Conversion, Solar Cells, 10.(1983) pp. 257–271.

A.C. Day, Application of the GaSb Solar Cell in Isotope–Heated Power Systems, Conference Record, 21st IEEE Photovoltaic Specialists Conference, May 1990, pp. 1320–1325.

L.D. Woolf, Optimum Efficiency of Single and Multiple Bandgap Cells in Thermalphotovoltaic Energy Conversion, Solar Cells, 19(1986–1987) pp. 19, 31.

Cell to Board
Electrical Connection
and Mirror Clearance

COMPACT MAN-PORTABLE THERMOPHOTOVOLTAIC BATTERY CHARGER

BACKGROUND OF THE INVENTION

This application claims the benefit of U.S. Provisional Application No. 60/046,588, filed May 15, 1997.

SUMMARY OF THE INVENTION

This invention provides a small and light cylindrical thermophotovoltaic (TPV) generator using gaseous fuels, a counter flow heat exchanger and low band gap photovoltaic cells.

In the new fuel injection system, with preheated air from a recuperator, fuel combustion begins immediately when the fuel and air first meet. Therefore, for a very hot and compact burn, complete and rapid fuel and air mixing is required. That is accomplished with a venturi to neck down the air flow and a chemically etched jet shim disk which creates over 150 small fuel jet streams.

In the new emitter geometric configuration, it is important to have good hot gas energy transfer to the IR (infrared) emitter. Four new alternate emitter configurations accomplish the transfer.

In the photovoltaic converter assembly, it is important to have good spectral control, good high rate but light weight heat removal and high current carrying capability, while maintaining low parasitic IR absorption. A modular photovoltaic converter circuit is complete with series connected low band gap filtered cells, a heat spreader and high current carrying mirror shielded interconnects.

An efficient but light weight and short heat exchanger which is fairly easy to fabricate is accomplished by inserting an array of angled vanes through slits in a simple cylinder.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
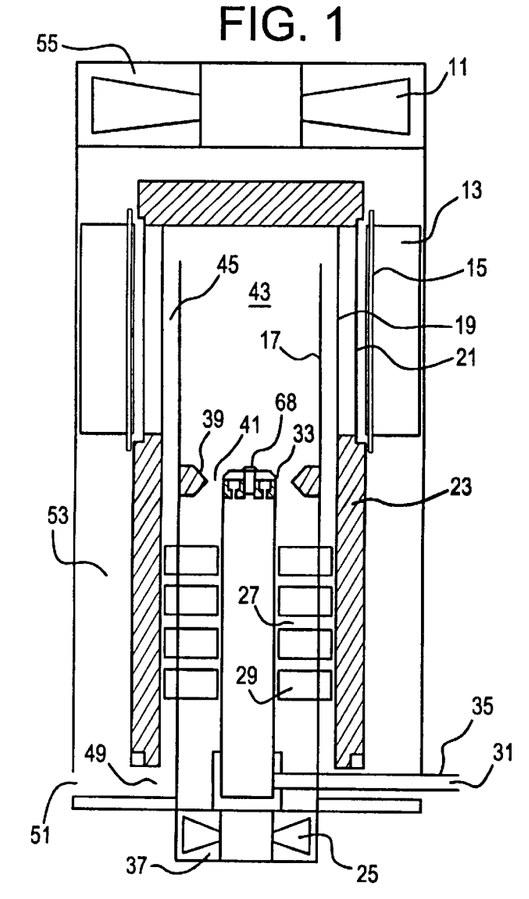
FIG. 1 is a cross-sectional schematic of the TPV battery charger.

As shown in FIG. 1, the TPV battery charger 10 has a cooling fan 11 which blows air over cooling fins 13. A photovoltaic converter assembly (PCA) 15 is separated from the inner 17 and outer 19 IR emitters by a quartz shield 21. Insulation 23 supports the outer emitter 19 and the quartz shield 21. A combustion air fan 25 supplies the combustion air 27 which is preheated by an angled vane heat exchanger 29. Fuel 31 is supplied to the preheated combustion air 27 by the fuel injector 33 which is shown partially in cross-section. Gaseous fuel enters inlet 35 and is released by the injector 33 into the combustion air. Combustion air enters annular inlet 37 and is blown upward by fan 25. Venturi 39 speeds the flow of combustion air through the combustion zone 41. The flames and hot gases in combustion chamber 43 heat the inner and outer IR emitters. The exhaust flows outward at the top of the combustion chamber 43 then downward in annular chamber 45 and transfers heat to heat exchanger 29 to preheat the incoming combustion air 27. The exhaust gases flow outward through the opening 49 at the bottom of insulation 23 and mix with air flowing out outlet 51.

Figure 2:
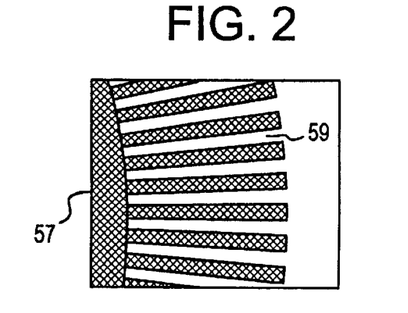
FIG. 2 is an enlarged partial bottom view of the etched shim depicting the chemically etched channels.
Figure 3:
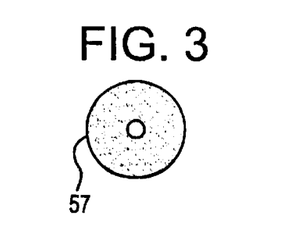
FIG. 3 is a plan view of the fuel injector shim.
Figure 5:
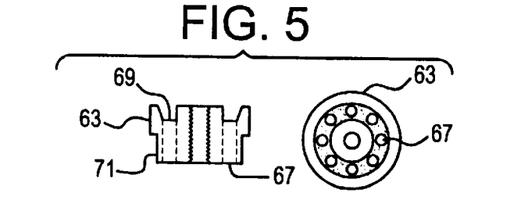
FIG. 5 is a plan view of the fuel injector feed cup.
Figure 6:
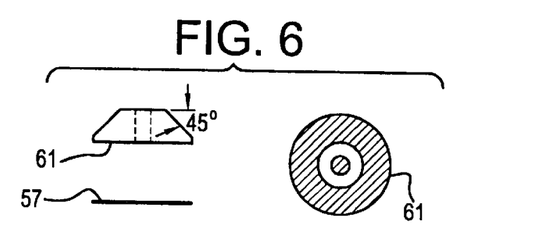
FIG. 6 is a plan view of the fuel injector feed cap.

FIGS. 2 and 3 show details of the jet shim 57 which is positioned in the injector 33. The purpose of the jet shim is two-fold. First, the shim is used to provide provision spacing (typically 0.003") between the cap 61 (FIG. 6) and the cup 63 (FIG. 5) of the fuel injector 33. Accurate control of this gap is necessary to regulate fuel flow into the combustion chamber 43. Second, since fuel can only flow in the chemically etched channels 59 of the shim 57, the shim delivers small, discrete jets of fuel to the combustion zone 41 at the neck of the venturi 39 leading to the combustion chamber 43. Typically, there are more than 150 jets, depending on shim 57 diameter, channel 59 width, and channel pitch. Typically, exit dimensions of each jet are 0.010" wide by 0.003" high, depending on channel 59 width and shim 57 thickness, respectively. Air flows up through the venturi neck 39 and perpendicularly intersects the plane of discrete fuel jets, providing excellent fuel to air mixing.

Figure 4:
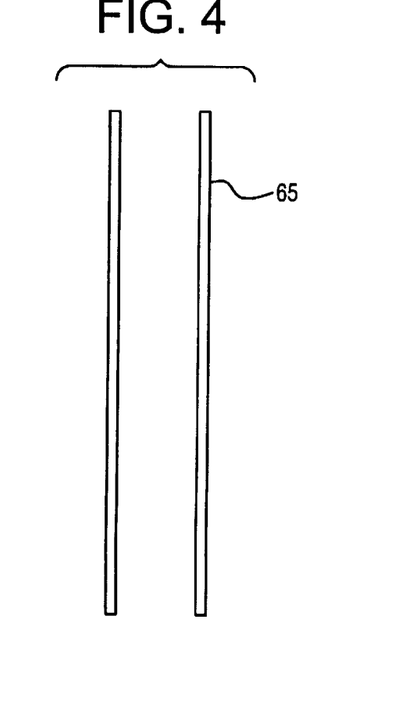
FIG. 4 is an exploded view of the fuel injector assembly.

FIG. 4 shows an exploded view of the fuel injector 33 assembly. Stainless steel tubing 65 supports and supplies fuel to the fuel injector 33. Fuel flows axially through eight quarter-inch holes 67 into an annular plenum 69 in cup 63 and then radially outward through controlled channels 59 in shim 57. An axial screw 68, shown in FIG. 1, holds the cap 61 (FIG. 6), shim 57 and cup 63 (FIG. 5) assembled. The cup base 71 is pressed into the upper end of tube 65.

Figure 7:
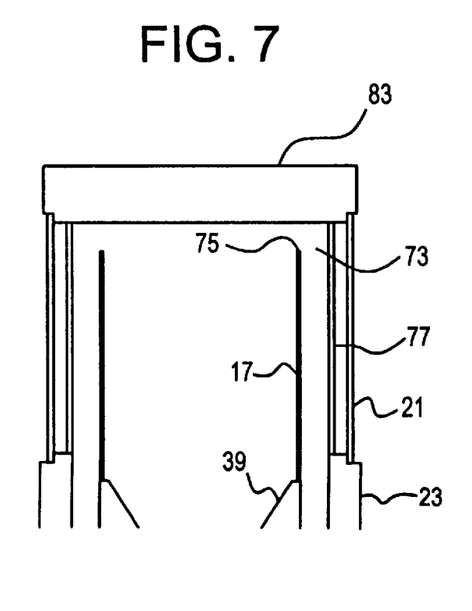
FIGS. 7–10 are elevational cross-sections of four possible emitter configurations.

FIGS. 7 through 10 provide four possible inner 17 and outer 19 IR emitter configurations. A spectrally matched emitter is used with continuous ceramic fiber reinforcement for durability. However, that limitation is not required for the present invention. To insure good heat transfer from the hot gas to the IR emitter, four alternate configurations are shown in FIGS. 7 through 10. In FIG. 7, the hot gases simply flow up axially inside the IR emitter 17, outward through opening 73 at its top 75, and axially downward outside the emitter, being confined by a quartz outer cylinder 77. Alternately in FIG. 8, the hot gases flow radially out through holes 79 in the emitter 81, again being confined by the outer quartz shield 77.

Figure 9:
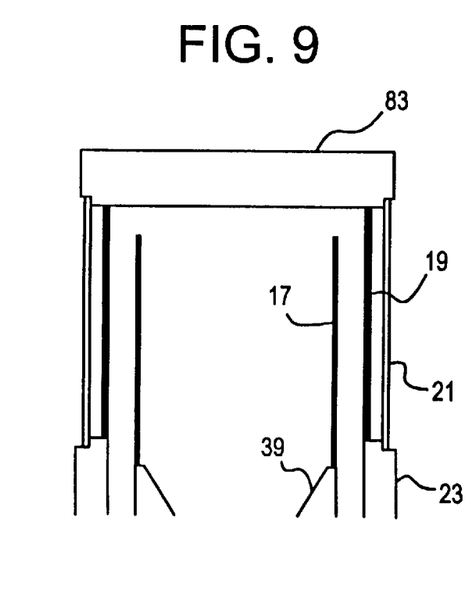
Figure 10:
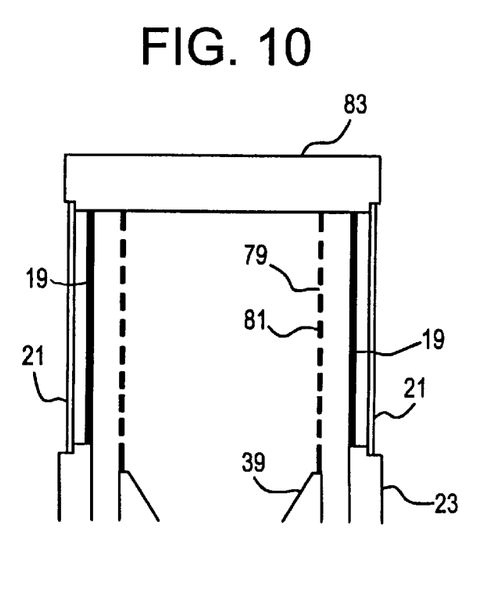

The problem with the above configurations is that the quartz shield 77 is in direct contact with very hot gases. More desirable configurations are shown in FIGS. 9 and 10. In those configurations, the quartz shield 77 is replaced by a second, larger IR emitter 19 which is heated by both gas contact and by radiation transfer from the inner emitter 17 or 81.

Figure 8:
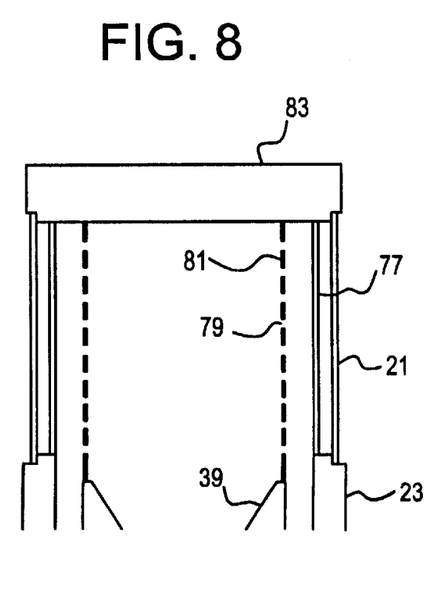

Which of the four configurations is used depends on a trade of material durability against generator power output and efficiency. In each configuration, the gases are confined from escaping upwards by insulated cover 83. In FIGS. 9 and 10, the quartz shields 77 and 21 are supported by insulation 23. In FIGS. 7 and 8, insulation 23 supports the quartz shield 21 and the outer IR emitter 19. In all configurations, the inner IR emitter 17 or 81 is supported at the top of venturi 39.

Figure 11:
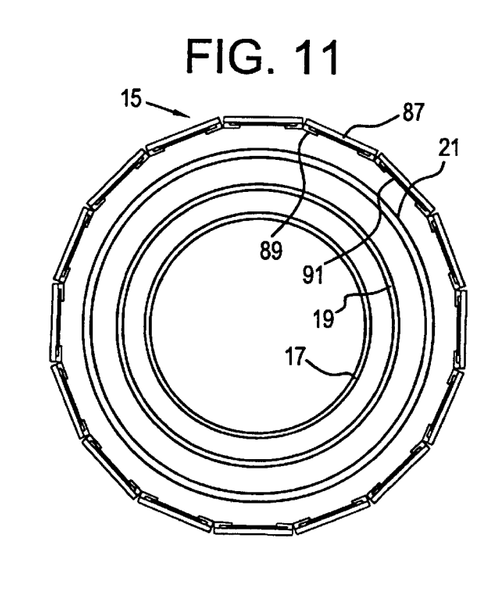
FIG. 11 is a cross-sectional plan view of a circuit, mirror and PCA configuration.

FIG. 11 shows a photovoltaic converter array (PCA) 15 consisting of an array of circuit boards 87, which are soldered to copper convoluted fin stock, shown in FIG. 1, and rolled into a cylinder. That forms a light weight array. Mirrors 89 cover connectors at edges of cells 91.

Figure 12:
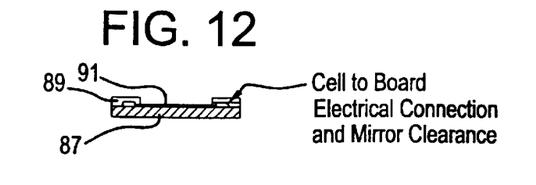
FIG. 12 is an end view of a single circuit.
Figure 13:
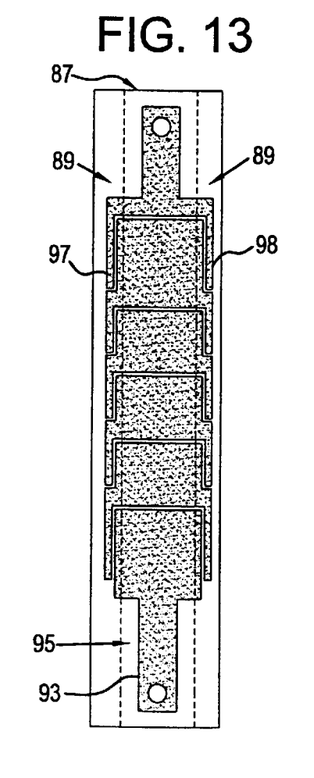
FIG. 13 is an elevation view of a single circuit.

FIGS. 12 and 13 show top and side views of an individual circuit board 87 of the array. Each circuit consists of a copper backing strip 93 with a thin dielectric electric insulating coating 95 on its front side with conducting metal pads 97 on the front of the dielectric. The low bandgap cells 91 with multilayer dielectric filters on their front faces are soldered to the pads 97 and interconnected by leads 98 running at the edges of the circuit. Gold coated edge mirrors 89 are glued over the leads.

Figure 14:
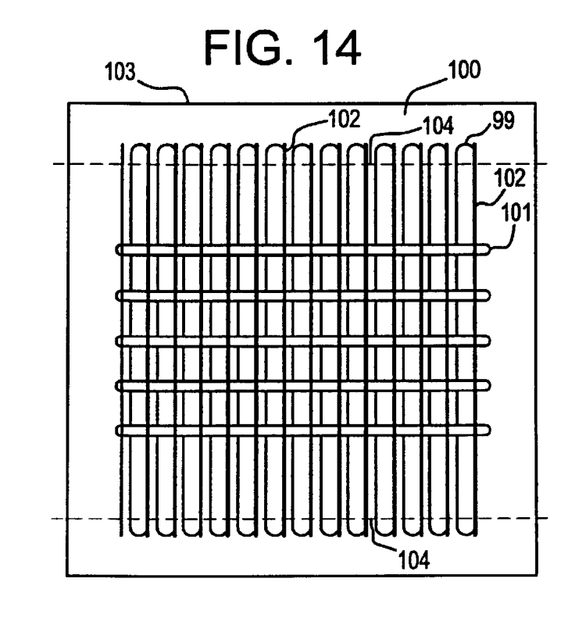
FIG. 14 shows fabrication in groups in a sheet of edge strip mirrors.

FIG. 14 shows how the edge strip mirrors 89 are fabricated in groups in a sheet. Since each mirror is 0.060" thick, a 0.060" thick aluminum sheet 103 polished on a front face is placed face down in a CNC mill on a vacuum chuck. Several vertical trenches 99 are cut out for the mirror overhang over the cell interconnect buses. Then several horizontal trenches 101 are cut where the mirror needs to bridge over the solder interconnects. Then a slitting saw is used to separate 102 the mirror strips along their length dimension but leaving them still connected to the sheet frame. The sheet is then anodized to form an isolating oxide, and then its front face is coated with a reflecting gold mirror. Finally, the mirror strips are separated by sheering 104 away the frame 100, and individual mirrors 89 are attached completing the circuit 87 fabrication.

Figure 15:
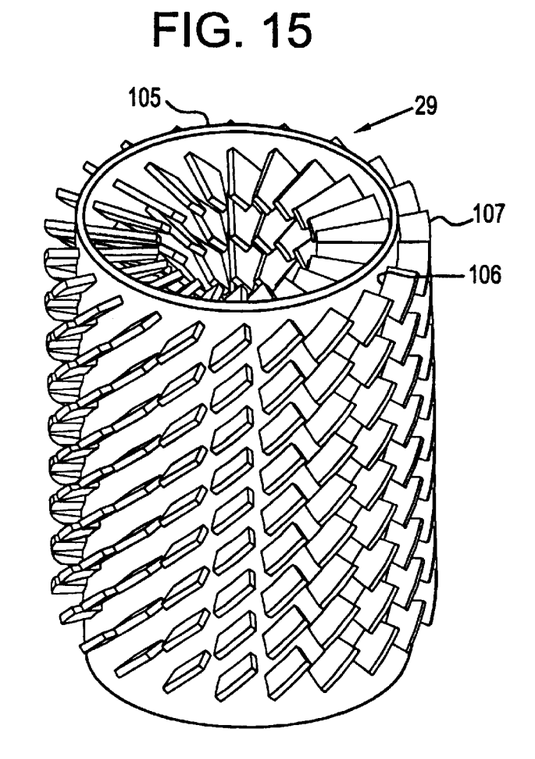
FIG. 15 is a perspective view of a finned heat exchanger.

FIG. 15 shows a perspective view of a finned heat exchanger 29. After the hot combustion gases transfer their energy to the radiation emitters 17 and 19, they continue on a downward path through the heat exchanger 29. High efficiency TPV burners require recuperation of heat energy from the combustion exhaust steam. Recuperated energy is used to preheat the intake combustion air to increase the combustion flame temperature, and thus increase overall system efficiency. Swirling of the combustion gas products is also known to increase heat transfer to the emitters of the TPV system. The present invention is designed to improve both heat exchanger efficiency and combustion gas swirl in a TPV system.

A cylindrical tube 105 forms the inner and outer walls of the heat exchanger. The tube is formed from high temperature materials such as copper-nickel alloys, alumina refractory, silicon carbide or other high temperature ceramics or metal alloys. Alternatively, the tube may be formed in two sections by a combination of two high temperature materials, or by combination of one high temperature material and a lower temperature material, such as aluminum. Slots 106 are cut or milled in the cylindrical tube, and heat exchanger fins 107 are inserted through the slots in the tube wall. Typical fin materials include stainless steel, inconel, copper-nickel alloys, silicon carbide, boron nitride, or other high temperature ceramics or metal alloys with reasonably high thermal conductivity. Fins consist of flat plates, typically 0.010" or 0.200" thick and 0.060" to 2.000" wide. The length of the fins is determined by design considerations such as fin efficiency and insertion length geometrical constraints on both the hot and cold sides of the heat exchanger. The fins may be either rectangularly shaped, or trapezoidally shaped, as shown in the cylinder in the interior of the tube. The trapezoidal fin shapes will allow higher fin density. Shoulders milled on the fins assist achieving the correct insertion depth. Fins may be loose fitting, press fit, or solder, brazed, or welded to the cylinder.

The fins 107 are inserted in a staggered helical pattern as shown in FIG. 15. The helical pattern establishes a swirl flow of the intake air flowing in the interior (cold side) of the heat exchanger tube 105. The angle of the fins is typically 45 degrees, and this angle may vary over the length of the cylindrical tube 105 in order to control the swirl. At the fan end of the heat exchanger, the fin angle may be adjusted to match the natural swirl established by the fan, typically about 50 degrees off horizontal and counter-clockwise. That minimizes the pressure drop through the heat exchanger 29. The swirl established in the intake air side of the heat exchanger 29 is maintained, to some extent, through the venturi 39 and combustion chamber 43, to give combustion gas swirl as energy is being transferred to the surfaces of emitter 17 and 19.

Figure 16:
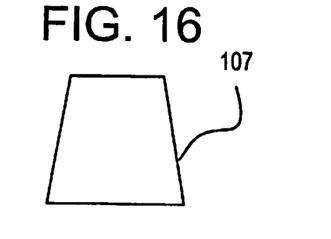
FIGS. 16 and 17 are plan views of the angled fins for inserting in slots in the cylinder shown in FIG. 15.
Figure 17:
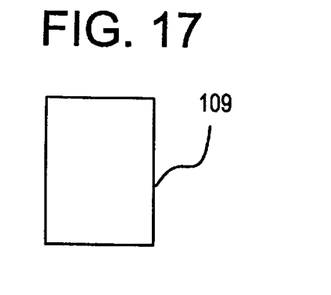

FIGS. 16 and 17 show plan views of angled trapezoidal 107 and rectangular 109 fins. The use of angled fins 107 to establish a helical air flow pattern on both sides of the heat exchanger 29 improves heat transfer by increasing the path length of the air through the heat exchanger, and thus increasing the heat transfer area on both sides of the exchanger. The relatively short width of the fins 107, 109 and the staggered insertion pattern serves to periodically interrupt the boundary layers formed on the fin surfaces, improving heat transfer effectiveness. The exact fin width, stagger pattern, fin density and fin angle will be determined by a tradeoff between pressure drop through the heat exchanger and improved heat transfer efficiency and combustion gas swirl.

Figure 18:
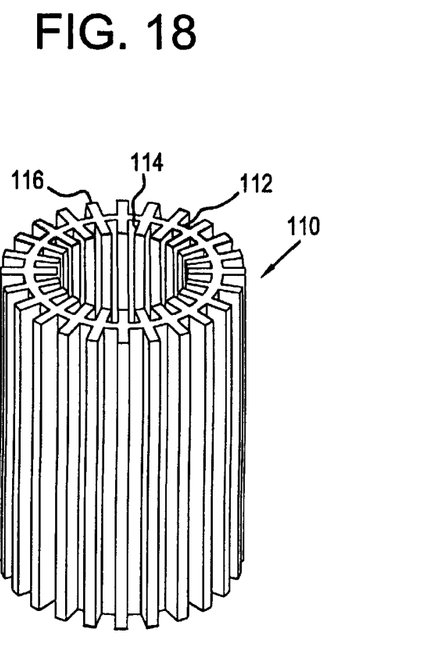
FIG. 18 is a perspective view of an extruded SiC recuperator finned tube.

In TPV recuperators using parallel welded stainless steel plates there is a problem at the hot end. Hot gases exiting the emitter section rapidly corrode the upper stainless steel plate. Thee is a need for a higher temperature material at the hot end of the recuperator. The solution is shown in FIG. 18. An extruded SiC tube has inside and outside radial fins.

The SiC composite regenerator 110 has a thin cylindrical tube 112, integrally formed internal fins 114 for extending into the combustion air conduit and preheating air, and external fins 116 for removing heat from the hot exhaust gases. The fins are integrally extruded or machined.

Figure 19:
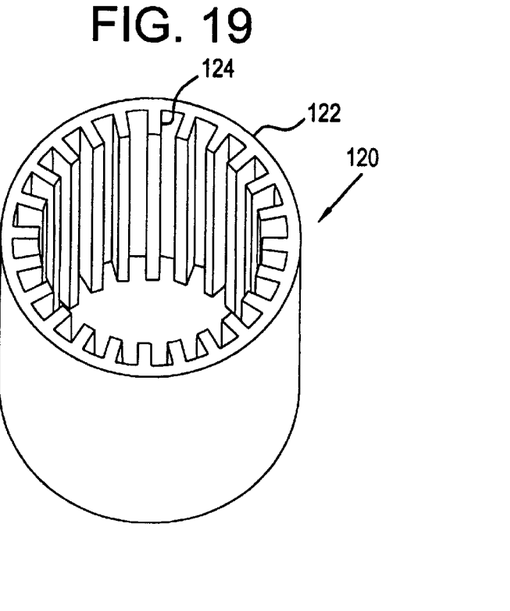
FIG. 19 is a perspective view of an extruded SiC emitter with inside radial fins.

There is a need to reduce the temperature of hot exhaust gases exiting the emitter section to reduce the thermal stress on the recuperator section. Increasing the heat transfer rate from the hot exhaust gases to the emitter by adding inside radial fins to the emitter meets that need. An inside radial fin emitter is shown in FIG. 19.

The SiC composite emitter 120 has a cylindrical body 122 with internally extending fins 124 for increasing temperature of the radiating body 122.

There is synergy in the fabrication method and material for the recuperator and emitter. There is also a more subtle synergy in that fins may be required on both the recuperator and the emitter for the emitter temperature to hit 1400° C. That fins are required on both parts is not obvious and only follows from careful analysis.

Table 1 presents the equations for calculating the temperature difference between a gas and a finned surface given geometry and heat transfer requirements, or the pressure difference through a fin array given geometry and a gas flow rate. These equations were first applied to the photovoltaic cell cooling problem, but they can also be used to analyze heat transfer in a finned recuperator or heat transfer from the hot combustion gases to the emitter.

Tables 2 and 3 summarize the ΔT and ΔP results for five different cases. The first column in both tables refers to the photovoltaic cooling fin design used in a first iteration. Although the ΔT of 100° C. that resulted was larger than was desired, the predicted ΔT using these equations matched the measured data and serves to validate the equations. The numbers in the next four columns refer to the present 200 Watt TPV generator design. The predicted numbers are within the required range.

The predicted ΔT value of 256° C. in the emitter column of Table 2 is particularly noteworthy. This number results assuming ⅛" thick ⅜" high fins on a 3.75" diameter 4" tall emitter separated by ⅛" gaps. The heat to be transferred to the emitter is 2 kW. If, instead of fins, an emitter and a radiator tube are simply separated by ¼", then the heat transfer coefficient, h, would decrease by 2, the heat transfer area would decrease by 2, and the difference between the emitter surface temperature and the gas temperature would rise by a factor of 4 to over 1000° C. Fins on the emitter are desirable. Without fins, if the radiator tube diameter is increased to fit closer to the emitter tube, the pressure may increase, and any small deviations in concentricity may lead to azimuth non-uniformity.

Another reason why fins are desirable is that, without fins, the radiator tube will be much hotter than the emitter tube. The temperature limit for the radiator tube material will then set the temperature limit for the emitter to below 1400° C. With fins on the emitter, the emitter temperature will be closer to the radiator tube temperature limit.

The finned SiC recuperator and emitter can be fabricated by extruding parts. It is also possible to machine the parts in graphite and then to convert the graphite to SiC.

In the finned emitter, fins may be of constant length. It may be desirable to taper the fin length with shorter fins at the top of the emitter cylinder and longer fins near the bottom to optimize the emitter temperature uniformity. With fins of constant length the emitter would tend to be hotter at its top, because the gas temperature will be hotter there. This tapered fin length could be accomplished by machining an extruded part in the green state before firing or by directly machining a graphite part.

Table 1: Fin design equations $$\Delta P = (32 \eta l/d^2) F/A_{xy}$$

where

ΔP is pressure change in Pascal,

η is viscosity in Pascal×second, l is fin length in cm, d is fin spacing in cm,

F is volumetric flow in cubic cm per second, and $A_{xy}$ is flow path area in $cm^2$.

$$\Delta T = Q/h A_{rz}$$

where

ΔT is temperature difference between gas and fin surface in ° C.

And h=Nu(k/d) is the heat transfer coefficient in Watts/$m^{2o}$ C.

Q is the net power transfer rate in Watts, $A_{rz}$ is the total fin area in square m, k is thermal conductivity of air in Watts/m° C., d is fin spacing in m, and Nu is the Nusselt number (=4 for present geometry).

TABLE 2

Temperature change through cooling fins, heat exchanger, and emitter.

| | | Cooling Fins | HX Up | | HX Down | Emit Down |
|---|---|---|---|---|---|---|
| Q | | 1 kW | 2 kW | 1 kW | 1 kW | 2 kW |
| $A_{rz}$ | | 0.16 $m^2$ | 1.2 $m^2$ | 0.036 $m^2$ | 0.06 $m^2$ | 0.06 $m^2$ |
| k | | .024 W/m ° C. | .024 | .075 | 0.1 | 0.1 |
| d | | 0.16 cm | 0.2 cm | 0.3 cm | 0.3 cm | 0.3 cm |
| h | | 60 W/$m^2$ ° C. | 48 | 100 | 130 | 130 |
| ΔT | | 100° C. | 35 | 278 | 128 | 256 |

TABLE 3

Pressure Change Through Cooling fins, heat exchanger, and emitter.

| | Cooling Fins | HX Up | HX Down | | Emit Down |
|---|---|---|---|---|---|
| F | 19 liter/s | 75 liter/s | 4.5 liter/s | 8 liter/s | 12 liter/s |
| $A_{xy}$ | 60 $cm^2$ | 184 $cm^2$ | 6 $cm^2$ | 9 $cm^2$ | 10 $cm^2$ |
| η | 0.2 × $10^{-4}$ Pa s | 0.2 × $10^{-4}$ | 0.4 × $10^{-4}$ | 0.6 × $10^{-4}$ | 0.8 × $10^{-4}$ |
| l | 8 cm | 10 cm | 10 cm | 10 cm | 10 cm |
| $d^2$ | 2.5 × $10^{-2}$ $cm^2$ | 45 × $10^{-2}$ $cm^2$ | $10^{-1}$ $cm^2$ | $10^{-1}$ $cm^2$ | $10^{-1}$ $cm^2$ |
| ΔP | 64 Pa | 64 Pa | 96 Pa | 171 Pa | 307 Pa |

In Table 3, F is volumetric flow in liters per second.

In FIGS. 1 and 9 a second, smaller, inner emitter 17 is shown. That second emitter is alternatively and interchangeably referred to herein as a radiator to distinguish it from the outer emitter 19. The radiator is heated both by heat conduction transfer from the combustion gases and heat radiation. Placing those two emitters or emitter and radiator close together with a narrow gap improves heat transfer but increases undesirable back pressure. By using internal fins on the outer emitter it is heated hotter, and the gap may be increased balancing radiant heat transfer from the inner to outer emitter and the provision of a sufficient gap therebetween to avoid pressure buildup. For example, an ⅛" gap is desirable for radiant heat transfer but pressure buildup results. Adding internal fins allows a ¼" gap which reduces pressure, while heating the outer emitter hotter.

While the invention has been described with reference to specific embodiments, modifications and variations of the invention may be constructed without departing from the scope of the invention, which is defined in the following claims.

We claim:

1. A portable thermophotovoltaic generator comprising a fuel tube, a fuel inlet mounted at a base of the fuel tube, a fuel injector mounted at a top of the fuel tube, a venturi adjacent the fuel injector, a combustion air tube surrounding the fuel tube for directing combustion air to the venturi, a combustion chamber beyond the fuel injector and venturi, and an infrared emitter surrounding the combustion chamber, an exhaust gas conduit surrounding the IR emitter and extending down along the combustion air tube, a finned heat exchanger connected to the exhaust conduit and having fins extending from a tube into the exhaust conduit and into the combustion air tube for preheating the combustion air, a shield surrounding the emitter and a photovoltaic converter assembly surrounding the shield, cooling fins connected to the photovoltaic converter assembly and extending outward therefrom, a cooling air tube surrounding the cooling fins for confining cooling air, an insulator surrounding the exhaust gas conduit, the insulator supporting the shield, and an insulated combustion chamber cover on the shield.

2. The apparatus of claim 1, wherein the heat exchanger comprises a recuperator, having a recuperator tube with slots arranged helically and having fins extending through the slots from outside the recuperator tube to inside the recuperator tube.

3. The apparatus of claim 2, wherein the recuperator fins are trapezoidal.

4. The apparatus of claim 3, wherein the recuperator fins have shoulders which abut an outside of the tube.

5. The apparatus of claim 2, wherein the recuperator fins are rectangular.

6. The apparatus of claim 1, wherein the fuel injector comprises a fuel distributor mounted in an end of the fuel tube and having an upward opening plenum, a jet disk mounted on top of the plenum and a cap mounted on top of the jet disk, the jet disk having multiple radial channels opening outwardly for releasing fuel outwardly in radial jets.

7. The apparatus of claim 6, wherein the jet disk comprises a thin disk having etched radial channels.

8. The apparatus of claim 7, wherein the jet disk is about 3 mils thick, and wherein the channels extend through the disk and are about 10 mils wide and about 1/10" in length.

9. The apparatus of claim 6, wherein the fuel distributor has axial holes which lead from a lower end of the fuel distributor to the plenum, and wherein the fuel distributor has a lower portion which is fit into an upper end of the fuel tube.

10. The apparatus of claim 6, wherein the plenum is annular and has a center post for mounting the disk and cap.

11. The apparatus of claim 1, wherein the IR emitter extends upward to a position below the combustion chamber cover, and wherein the combustion gases flow upward and over the top of the IR emitter and down along an outside of the IR emitter.

12. The apparatus of claim 11, wherein the IR emitter comprises a first IR emitter, and further comprising a second IR emitter positioned outside of the exhaust gas conduit parallel to the first IR emitter for flowing the exhaust gases downward between the first and second IR emitters.

13. The apparatus of claim 12, outer emitter comprises a high temperature composite material with emitter fins extending inward towards the combustion chamber.

14. The apparatus of claim 13, wherein the emitter fins have larger sizes near a bottom of the emitter and smaller fins near a top of the emitter where combustion gas temperatures are hotter.

15. The apparatus of claim 1, wherein the IR emitter has holes extending through the emitter, and wherein the exhaust gases pass through the holes in the IR emitter into the exhaust gas conduit outside the IR emitter.

16. The apparatus of claim 15, wherein the IR emitter comprises a first IR emitter, and further comprising a second IR emitter positioned outside of the exhaust gas channel parallel to the first IR emitter for flowing the exhaust gases downward between the first and second IR emitters.

17. The apparatus of claim 1, wherein the photovoltaic converter assembly comprises a plurality of circuit boards arranged side by side outside the shield, parallel to the emitter, and a plurality of thermophotovoltaic cells mounted on the circuit boards, and a plurality of mirrors mounted on the edges of the circuit board along the edges of the thermophotovoltaic converter cells.

18. The apparatus of claim 17, further comprising connectors mounted along the cells between the circuit boards and the mirrors, wherein the mirrors protect the connectors, edges of the cells, and edges of the circuit boards from direct heating by the emitter.

19. The apparatus of claim 1, further comprising a cooling air fan positioned above the cooling fins for blowing cooling air through the cooling air tube across the cooling fins and outward through a cooling air opening near a base.

20. The apparatus of claim 19, further comprising an exhaust gas opening from the exhaust conduit near the cooling air opening for mixing the cooling air with the exhaust gases and blowing the exhaust gases outward with the cooling air.

21. The apparatus of claim 1, wherein the heat exchanger comprises a high temperature composite material having fins integrally formed therewith.

22. The apparatus of claim 21, wherein the high temperature material is a silicon carbide.

23. A recuperator apparatus comprising a finned heat exchanger having a recuperator tube with spaced slots formed in the tube and having fins extending through the slots from outside the tube to inside the tube for transferring heat from fluids moving on one side of the tube to fluids moving on an opposite side of the tube.

24. The apparatus of claim 23, wherein the slots are arranged helically on the regenerator tube for swirling the fluids on opposite sides of the tube.

25. The apparatus of claim 23, wherein the recuperator fins are trapezoidal.

26. The apparatus of claim 23, wherein the recuperator fins have shoulders which abut the tube.

27. The apparatus of claim 23, wherein the recuperator fins are rectangular.

28. A recuperator apparatus comprising a high temperature SiC composite material having a tube and integrally formed fins on an internal side of the tube for extending into a combustion air conduit, and external fins on an outer side of the tube for extending into a hot exhaust air conduit.

29. A fuel injector apparatus comprising a fuel tube, a fuel cup mounted on an end of the fuel tube and having an outward opening annular plenum, a jet shim disk mounted on the cup and a cap mounted on the jet shim disk, the jet shim disk having multiple radial channels communicating with the plenum and opening outwardly for releasing fuel outwardly in radial jets.

30. The apparatus of claim 29, wherein the shim disk comprises a thin disk having etched radial channels.

31. The apparatus of claim 30, wherein the shim disk is about 3 mils thick, wherein the channels extend through the disk and are about 10 mils wide and about 0.1" long, and wherein the plenum has a rim that is about 0.06" thick and the fuel flows over the rim of the plenum and out through the channels.

32. The apparatus of claim 29, wherein the fuel cup has axial holes which lead from an end of the fuel cup to the plenum, and wherein the fuel cup has a portion which is fit into the end of the fuel tube.

33. An infrared (IR) emitter apparatus comprising a first cylindrical IR emitter for surrounding a combustion chamber, wherein combustion gases flow over the first IR emitter, an exhaust gas conduit along an outside of the first IR emitter, and a second IR emitter positioned outside of the exhaust gas conduit parallel to the first IR emitter for flowing exhaust gas between the first and second IR emitters.

34. The apparatus of claim 33, wherein the first IR emitter has holes extending through the emitter, and wherein the exhaust gases pass through the holes in the IR emitter into the exhaust gas conduit outside the first IR emitter.

35. The apparatus of claim 33, wherein the first IR emitter terminates short of a combustion chamber end so that combustion gases flow over an inside of the first IR emitter, around its end and back along an outside of the first emitter.

36. The apparatus of claim 35, wherein the second emitter comprises a high temperature composite material with emitter fins extending inward towards the combustion chamber.

37. A photovoltaic converter assembly apparatus comprising a plurality of circuit boards arranged side by side and a plurality of thermophotovoltaic cells mounted on the circuit boards, and a plurality of mirrors mounted on the edges of the circuit boards along the edges of the thermophotovoltaic cells, and connectors mounted along the cells between the circuit boards and the mirrors, wherein the mirrors protect the connectors, edges of the cells, and edges of the circuit boards from direct heating by the emitter.

38. The apparatus of claim 37, wherein the circuit boards comprise metal backing strips with front insulating coatings and are joined together edge to edge, wherein the connectors comprise conducting metal pads mounted on the insulating coatings, and wherein the cells are low bandgap cells with multilayer dielectric filters on faces thereof soldered to the pads and interconnected by the connectors.

39. The apparatus of claim 38, wherein the mirrors are formed from a polished metal sheet which is trenched for bridging connections and has an anodized isolating oxide on an inner side and a gold mirror coating on its face.

40. A method of making a heat exchanger comprising providing a tube with spaced slots in the tube, inserting fins partially through the slots and preventing further movement of the fins through the slots.

41. A method of making protective mirrors comprising providing a polished metal sheet, forming trenches in a first surface of the sheet for receiving connectors and connections, slitting the sheet to partially separate mirrors, forming an insulating coating on the first surface and in the trenches, coating a second opposite surface with a gold mirror, removing frames from the sheet and separating the mirrors.

42. A method of making a fuel injector comprising providing a fuel cup with an annular plenum, providing axial openings in the cup to the plenum, etching fine radial channels in a circumferential edge of a disk, placing the disk on the fuel cup, communicating the channels with the plenum, and overlying the disk and channels with a cap and connecting the cap to the fuel cup.

43. A method of making a photovoltaic array comprising providing boards with metal backing strips with thin insulating coatings on front sides of the strips, providing conducting metal pads on the insulating coatings, providing low bandgap cells with multilayer dielectric filters, soldering the cells to the pads, interconnecting the pads by conductor leads at edges, serially connecting the conductor leads, connecting gold coated edge mirrors over the leads, and laterally interconnecting the boards in an array.

* * * * *